US010515462B2

(12) United States Patent
Robles-Kelly et al.

(10) Patent No.: US 10,515,462 B2
(45) Date of Patent: Dec. 24, 2019

(54) PIXEL WISE ILLUMINANT ESTIMATION

(71) Applicant: National ICT Australia Limited, Eveleigh, NSW (AU)

(72) Inventors: Antonio Robles-Kelly, Eveleigh (AU); Lawrence Mutimbu, Eveleigh (AU)

(73) Assignee: National ICT Australia Limited, Eveleigh, NSW (AU)

( * ) Notice: Subject to any disclaimer, the term of this patent is extended or adjusted under 35 U.S.C. 154(b) by 96 days.

(21) Appl. No.: 15/743,506

(22) PCT Filed: Jun. 24, 2016

(86) PCT No.: PCT/AU2016/050539
§ 371 (c)(1),
(2) Date: Jan. 10, 2018

(87) PCT Pub. No.: WO2017/008105
PCT Pub. Date: Jan. 19, 2017

(65) Prior Publication Data
US 2018/0204352 A1    Jul. 19, 2018

(30) Foreign Application Priority Data
Jul. 10, 2015    (AU) ............................... 2015902732

(51) Int. Cl.
*G06T 7/90*    (2017.01)
*G06T 5/00*    (2006.01)

(52) U.S. Cl.
CPC ............... *G06T 7/90* (2017.01); *G06T 5/009* (2013.01); *G06T 2207/10024* (2013.01); *G06T 2207/20016* (2013.01)

(58) Field of Classification Search
CPC combination set(s) only.
See application file for complete search history.

(56) References Cited

U.S. PATENT DOCUMENTS

| 6,839,088 B2* | 1/2005 | Dicarlo | G01N 21/55 348/223.1 |
| 8,253,824 B2 | 8/2012 | Benezra et al. | |
| 8,334,870 B2* | 12/2012 | Yang | G06T 11/001 345/419 |
| 8,670,620 B2* | 3/2014 | Robles-Kelly | G06K 9/0063 382/191 |

(Continued)

FOREIGN PATENT DOCUMENTS

| AU | 2010291852 B2 | 8/2010 |
| WO | WO2011/026167 A1 | 3/2011 |
| WO | WO2014/176641 A1 | 11/2014 |

OTHER PUBLICATIONS

Ren et al., "Cue Integration for Figure/Ground Labeling," Computer Science Division, University of California, Berkeley, CA 94720, 8 pages. Retrieved from https://www2.eecs.berkeley.edu/Research/ProjectsICS/vision/.../rfm-nips05.pf Accessed on Mar. 6, 2019.

(Continued)

*Primary Examiner* — Tsung Yin Tsai
(74) *Attorney, Agent, or Firm* — Kilpatrick Townsend & Stockton LLP

(57) ABSTRACT

The disclosure concerns estimating an illumination spectrum of a pixel of hyperspectral or multispectral image data. A processor determines an optimised illumination spectrum for a first point based on an initial illumination spectrum and based on associations between the first point and multiple second points of multiple instances of the image data, wherein each of the multiple instances is associated with a refined amount of image information. It is possible to determine the illumination spectrum per pixel of the original image data without clustering pixels or restrictive assumptions but instead by utilising the associations for the statistical inference on the illumination spectrum.

19 Claims, 12 Drawing Sheets

(56) References Cited

U.S. PATENT DOCUMENTS

| | | | |
|---|---|---|---|
| 2009/0096895 A1* | 4/2009 | Benezra | H04N 9/735 348/234 |
| 2010/0172574 A1* | 7/2010 | Finlayson | G06T 5/50 382/162 |
| 2011/0191067 A1* | 8/2011 | Robles-Kelly | G06T 9/00 702/189 |
| 2012/0141044 A1 | 7/2012 | Kwatra et al. | |
| 2012/0183213 A1* | 7/2012 | Robles-Kelly | G06K 9/00362 382/165 |
| 2012/0207404 A1* | 8/2012 | Robles-Kelly | G06K 9/4661 382/286 |
| 2016/0078317 A1* | 3/2016 | Gu | G06K 9/0063 382/190 |

OTHER PUBLICATIONS

Boykov et al., "Fast Approximate Energy Minimization via Graph Cuts," IEEE Transactions on Pattern Analysis and Machine Intelligence, vol. 23, No. 11, Nov. 2001, 18 pages.

Gu et al., "Segmentation and Estimation of Spatially Varying Illumination," IEEE Transactions on Image Processing, vol. 23, No. 8, Aug. 2014, 12 pages.

European Search Report for EP 16823546 dated Dec. 17, 2018, all pages.

International Search Report and Written Opinion corresponding to PCT/AU2016/050539 dated Sep. 23, 2016, nine pages.

Zhang, Y. et al., GPU-accelerated large-size VHR images registration via coarse-to-fine matching, Computers & Geosciences, vol. 66, May 2014, pp. 54-65.

Koschan, A. et al., Dense depth maps by active color illumination and image pyramids, Advances in computer vision, 1997, pp. 137-148.

Beigpour, S. et al., Multi-illuminant estimation with conditional random fields, IEEE transactions on image processing, vol. 23, No. 1, Jan. 2014, pp. 83-96.

Drost, R. et al., Factor graph methods for three dimensional shape reconstruction as applied to LIDAR imaging, Optical society of America, vo. 21, No. 10, Oct. 2004, pp. 1855-1868.

* cited by examiner

Algorithm 1 - Pixelwise Illuminant Recovery

Require: $I(u)$: image data; $\sigma \in \Gamma$: set of Gaussian scales; $b$: bandwidth parameter for the quick-shift method [Vedaldi08]; $\tau$ kernel cut-off variable

Ensure: Illuminant estimate $L(u)$

1: for all $k \in \mathcal{K}$ do
2:    for all $\sigma \in \Gamma$ do
3:       Initialise illuminant estimate according to Algorithm 2 at scale $\sigma$
4:    end for
5:    Construct graph $\mathcal{G}_k$ corresponding to the $k^{th}$ colour constancy method under consideration
6:    Triangulate graph $\mathcal{G}_k$ using the convex hull technique in [Zhang94]
7:    for all Edges $e \in \mathcal{E}$ connecting variables in $\mathcal{V}$ and factors in $\mathcal{F}$ do
8:       Perform message passing using Equations (12) and (11)
9:    end for
10:    Find $L_{\sigma,k}(u)$ using the probabilities $P(\ell_i | L_{\sigma,k}(u))$ at the finest scale as shown in Equation (14).
11: end for
12: return $L(u)$ given by the geometric mean in Equation (15)

Fig. 13

Algorithm 2 - Compute illuminant prototypes $\ell_i$, $\forall k$ and initial illuminant estimates

Require: $I(u)$: input image; $k \in \mathcal{K}$: illuminant yielded by the $\mathcal{K}$ methods under consideration; $\sigma \in \Gamma$: set of Gaussian scales; $b$: bandwidth parameter for the method in [Vedaldi08]

Ensure: Illuminant prototypes $\forall k, \ell_i \in \Upsilon_k$

1: for all $k \in \mathcal{K}$ do
2:    for all $\sigma \in \Gamma$ do
3:       Filter image using the Gaussian kernel in Equation (16) at scale $\sigma$, $\mathcal{I}_\sigma \leftarrow \mathcal{I}$
4:       Partition $\mathcal{I}_\sigma$ into patches, $\bigcup_m \mathcal{I}_{\sigma,m} \leftarrow \mathcal{I}_\sigma$
5:       for all $\mathcal{I}_{\sigma,m} \in \mathcal{I}_\sigma$ do
6:          Compute uniform illuminant using the $k^{th}$ algorithm in $\mathcal{K}$
7:       end for
8:       $L_{\sigma,k}^{(0)} \leftarrow \mathcal{I}_\sigma$
9:    end for
10:   Apply the method in [Vedaldi08] to all $\mathcal{I}_\sigma$ to find $\ell_i \in \Upsilon_k$
11: end for
12: return $\bigcup_k \{\Upsilon_k\}$, $\bigcup_{\sigma,k} \{L_{\sigma,k}^{(0)}\}$

Fig. 14

PIXEL WISE ILLUMINANT ESTIMATION

CROSS-REFERENCE TO RELATED APPLICATIONS

The present application claims priority from Australian Provisional Patent Application No 2015902732 filed on 10 Jul. 2015, the content of which is incorporated herein by reference.

TECHNICAL FIELD

The disclosure concerns processing of electronic images, such as hyperspectral or multispectral images. In particular the invention concerns, but is not limited to, methods, software and computer systems for estimating an illumination spectrum of a pixel of image data.

BACKGROUND ART

Since the appearance of an object in a scene depends greatly upon the illuminant colour, the recovery of the light power spectrum finds applications in recognition, surveillance and visual tracking. Despite its importance, the recovery and identification of illuminant colours in the scene has proven to be a difficult task in uncontrolled real world imagery. This is mainly due to the fact that the recovery of the region-wise illuminant from a single image is an under-constrained problem. As a result, existing colour constancy algorithms, such as the grey-world, grey-edge and shades of grey method, assume uniform illumination or an achromatic scene. In other solutions, the colour constancy problem is tackled assuming that the statistical mean of the spatial derivative across the image is independent of the chromaticity or it is assumed the reflectance distribution to be Gaussian.

In natural everyday scenes, however, these assumptions can be too restrictive. This arises because in practice, real-world imagery can comprise shadows, highlights and albedo variations arising from several light sources.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

A method for determining an illumination spectrum for a first point of image data comprises:
  determining an optimised illumination spectrum for the first point based on an initial illumination spectrum and based on associations between the first point and multiple second points of multiple instances of the image data, wherein each of the multiple instances is associated with a refined amount of image information.

Since the optimised illumination spectrum is determined based on associations between points of instances with a refined amount of image information, it is possible to determine the illumination spectrum per pixel of the original image data without clustering pixels or restrictive assumptions but instead by utilising the associations for the statistical inference on the illumination spectrum. This as an advantage over other methods as the determined illumination spectrum is more accurate and less influenced by further input, which would require knowledge about the image data.

The method may further comprise determining the initial illumination spectrum for the first point and multiple initial illumination spectra for each of the multiple second points based on multiple prototypes of illuminant spectra.

The method may further comprise determining the multiple prototypes of illuminant spectra based on the multiple instances of the image data.

Determining the multiple prototypes may comprise determining the multiple prototypes based on regions of the image data and the multiple instances of the image data.

The method may further comprise determining the associations between the first point and the multiple second points.

Determining the associations may comprise creating a relational structure between the multiple instances.

Creating the relational structure may comprise performing a triangulation.

The method may further comprise determining the multiple instances of the image data by refining the amount of information associated with each of the multiple instances.

Refining the amount of information may comprise applying a filtering operation to the image data.

Refining the amount of information may comprise sub-sampling the image data.

Refining the amount of information may comprise augmenting the image data.

Determining the optimised illumination spectrum may comprise performing message passing over the associations.

Determining the optimised illumination spectrum may comprise performing a statistical estimation of the illumination spectrum for the first point of the image data.

The image data may be one of:
  hyperspectral image data; and
  trichromatic image data.

The method may further comprise performing white balance adjustment based on the illumination spectrum.

The method may further comprise determining multiple initial illumination spectra for the first point, wherein determining the optimised illumination spectrum is based on the multiple initial illumination spectra for the first point.

Each of the multiple illumination spectra may be associated with a respective subgraph.

Software, when installed on a computer, causes the computer to perform the above method.

A computer system for determining an illumination spectrum for a first point of image data comprises:
  an input port to receive the image data; and
  a processor to determine an optimised illumination spectrum for the first point based on an initial illumination spectrum and based on associations between the first point and multiple second points of multiple instances of the image data, wherein each of the multiple instances is associated with a refined amount of image information.

Optional features described of any aspect, where appropriate, similarly apply to the other aspects also described here.

An example will be described with reference to

Figure 4:
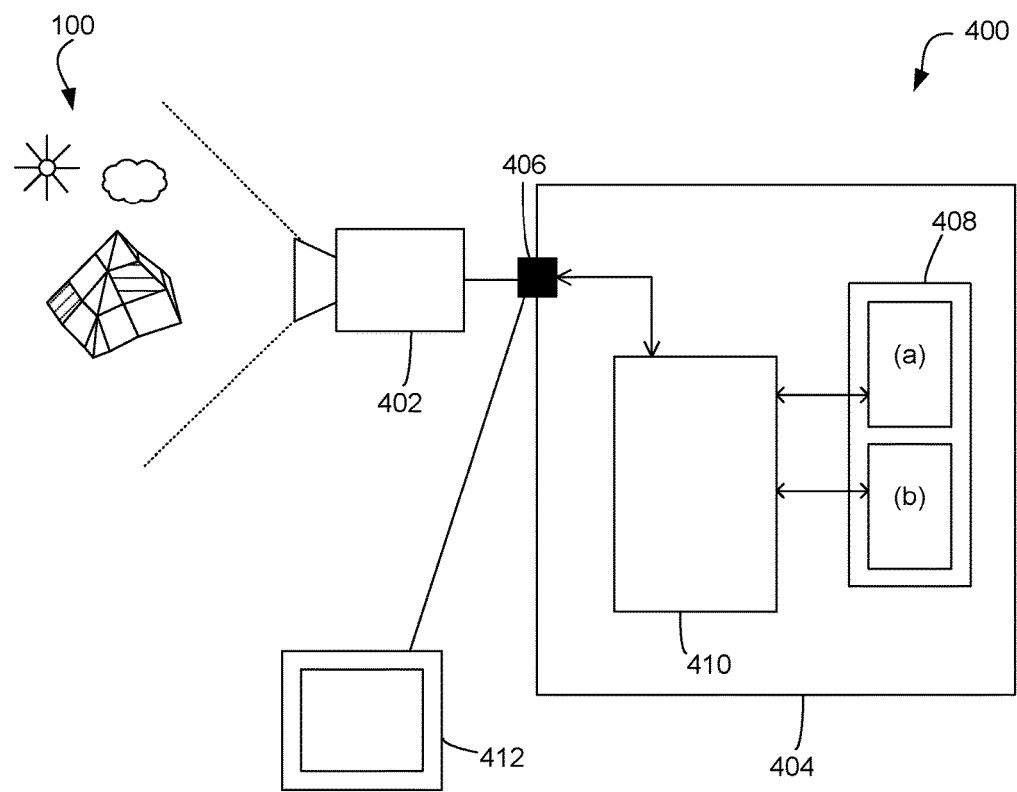

FIG. 4 illustrates a computer system for determining an illumination spectrum for a point of image data.

Figure 5:
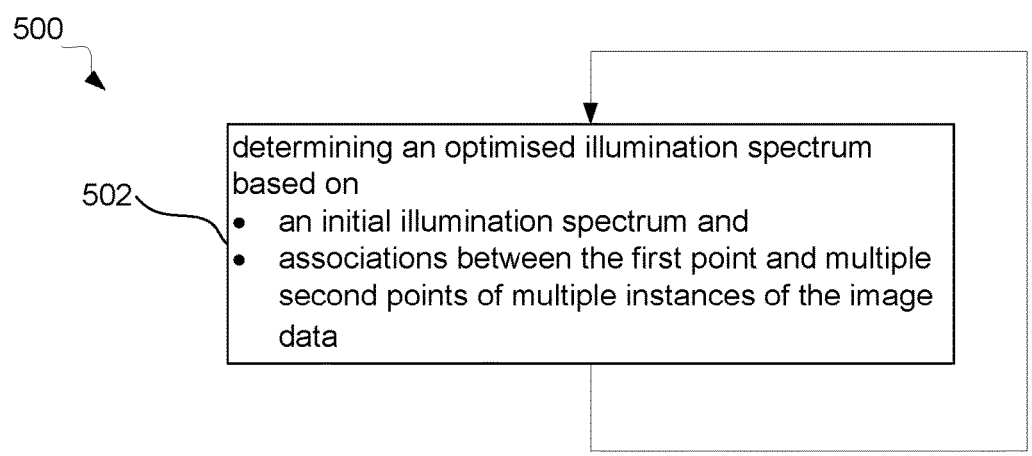

FIG. 5 illustrates a computer implemented method for estimating an illumination spectrum for a point of image data.

Figure 6:
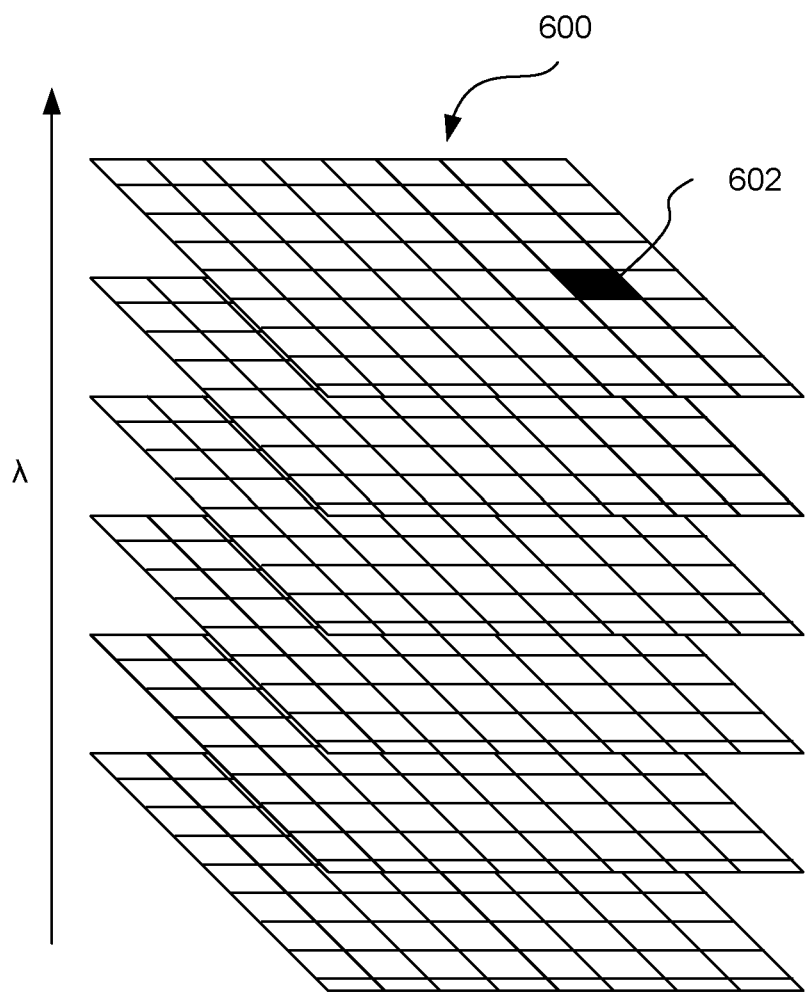

FIG. 6 illustrates a data structure for the multispectral image data.

Figure 7A:
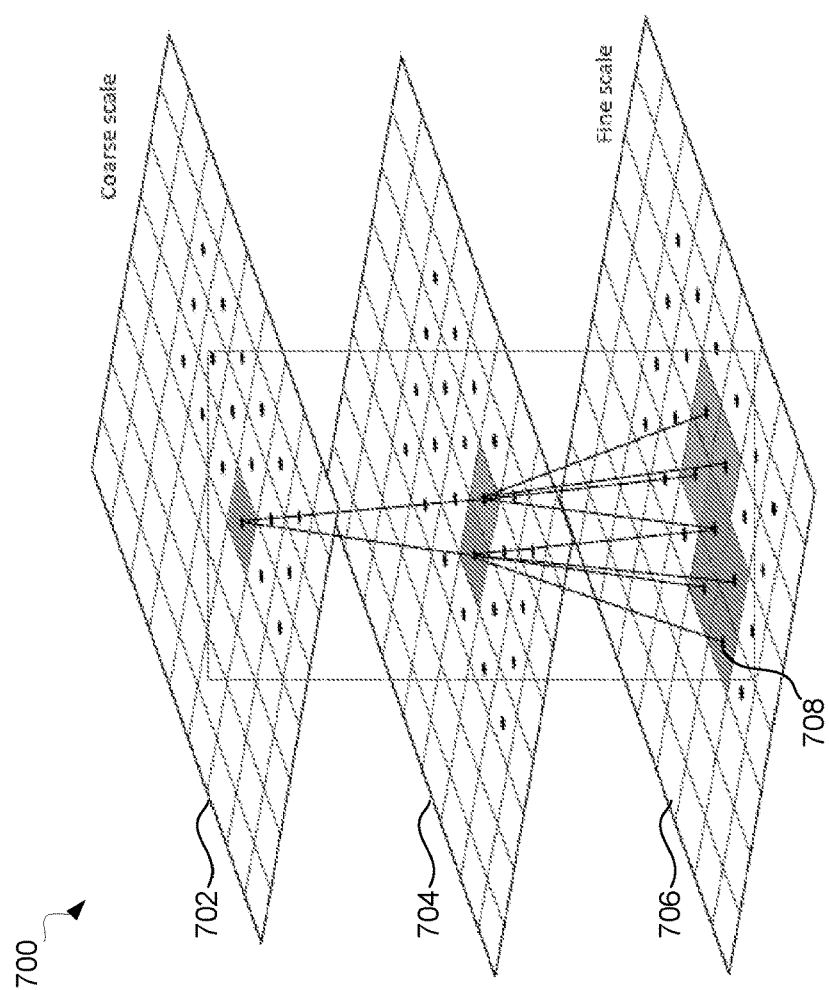

FIG. 7a illustrates a scale space and the interaction of uniform grid patches across scales. This shows how a pyramid-like graph is induced by the coarse-to-fine relationship between pixels at different scales.

Figure 7B:
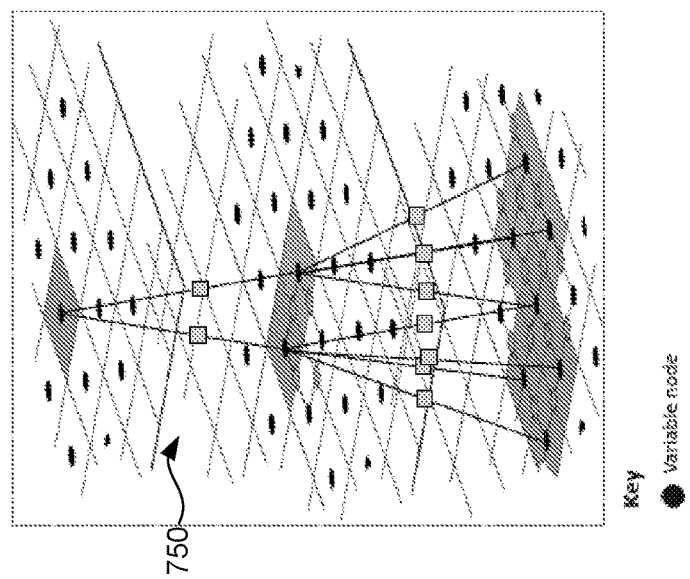

FIG. 7b illustrates a factor graph arising from the pyramid in FIG. 7a, where variables are shown as round markers whereas the factors are depicted as squares.

Figure 8B:
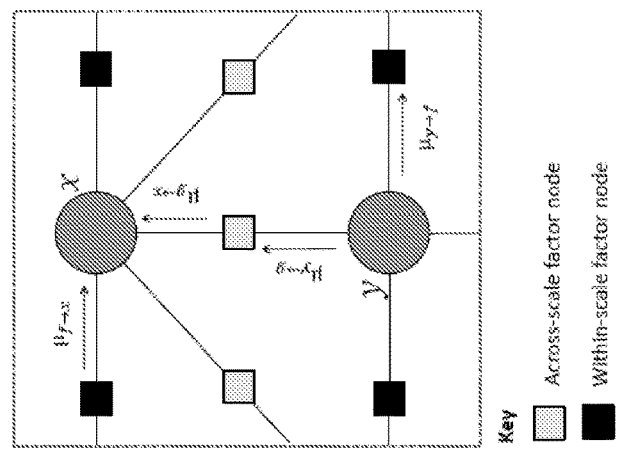
Figure 8A:
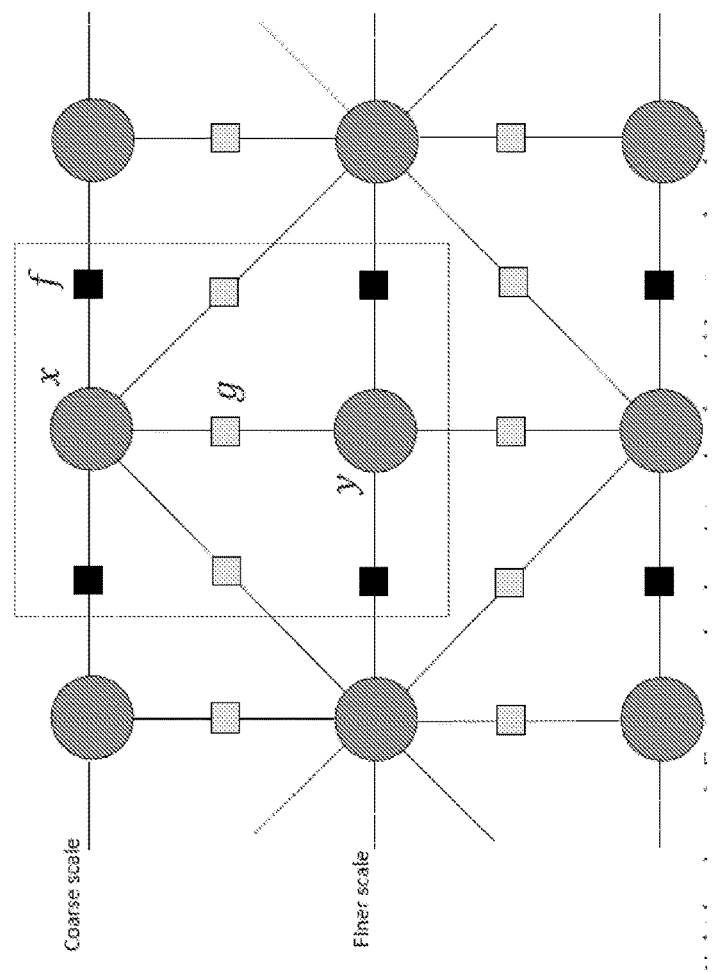

FIG. 8a illustrates a factor graph where interrelated variables (round nodes) are connected to factors (square nodes).

FIG. 8b illustrates incoming and outgoing messages along edges between variable and factor nodes within the same scale, and nodes in adjacent scales in the graph.

Figure 9A:
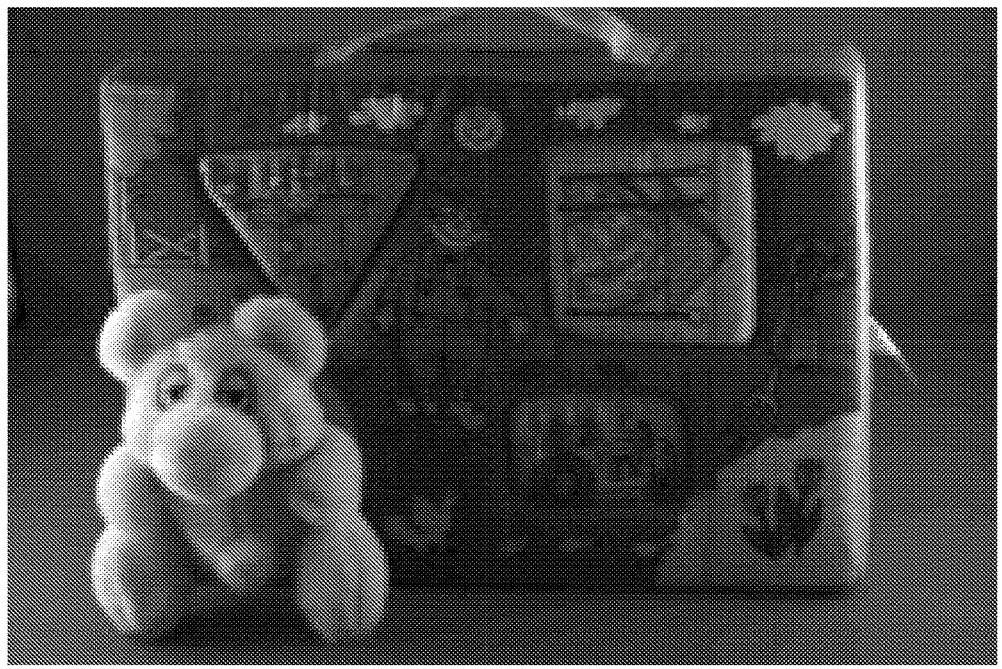
Figure 9B:

FIGS. 9a and 9b illustrates respective example images.

Figure 10A:
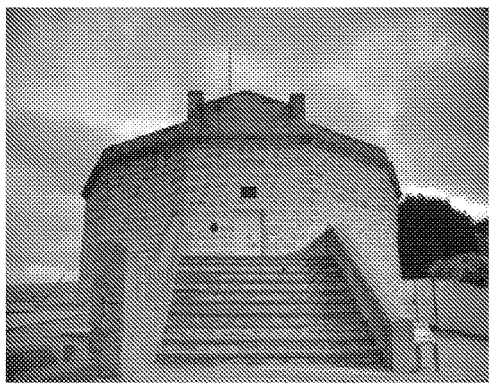
Figure 11A:

FIGS. 10a and 11a illustrate respective real-world input images.

Figure 10B:
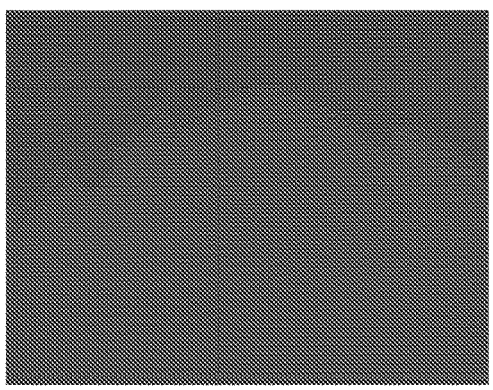
Figure 11B:
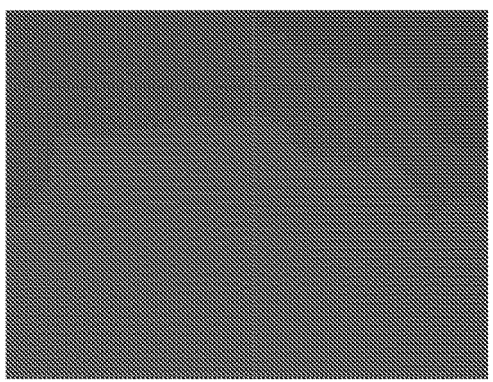

FIGS. 10b and 11b illustrate respective illuminant maps yielded by the method of FIG. 5 when applied to the images of FIGS. 10a and 11b.

Figure 10C:
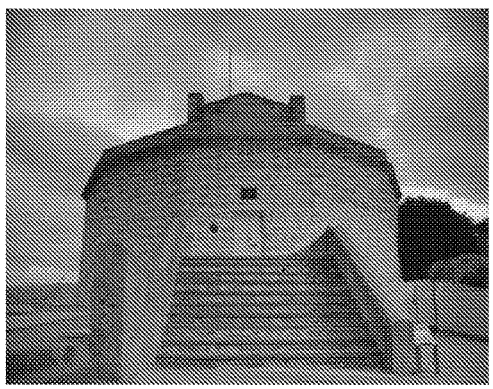
Figure 11C:
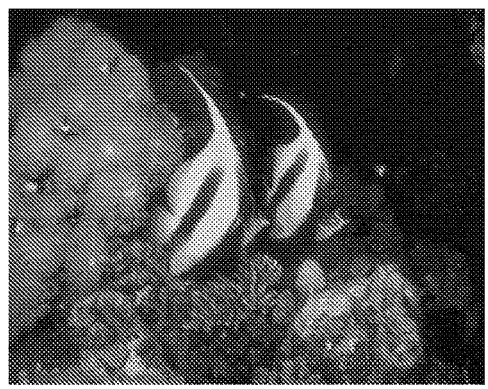

FIGS. 10c and 11c illustrate respective corrected images.

Figure 12:
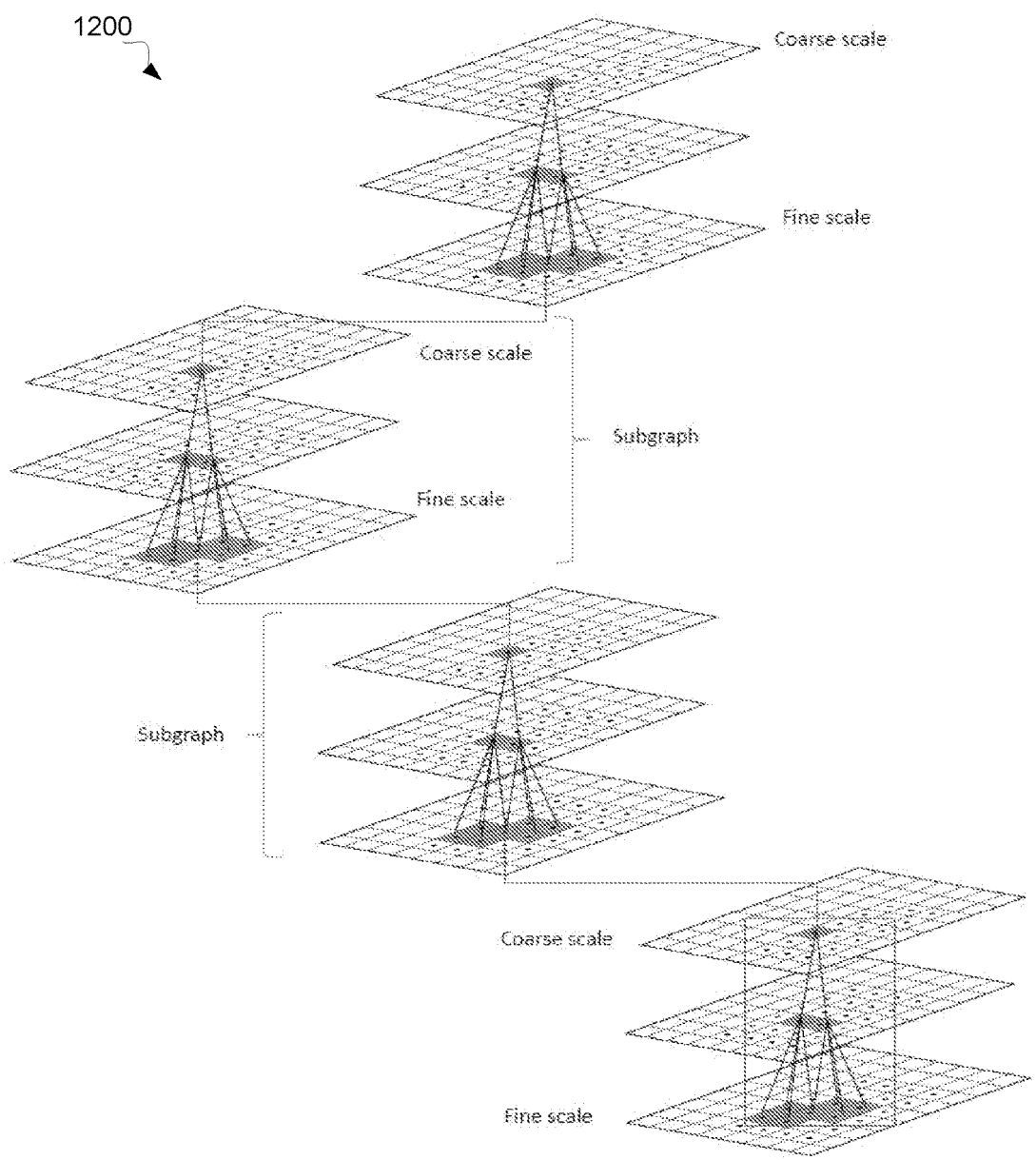

FIG. 12 illustrates the relationships between subgraphs and pixels at different scales.

FIG. 13 illustrates a method for pixelwise illuminant recovery.

FIG. 14 illustrates a method for initialising an illuminanent estimate.

BEST MODE FOR CARRYING OUT THE INVENTION

Figure 1:
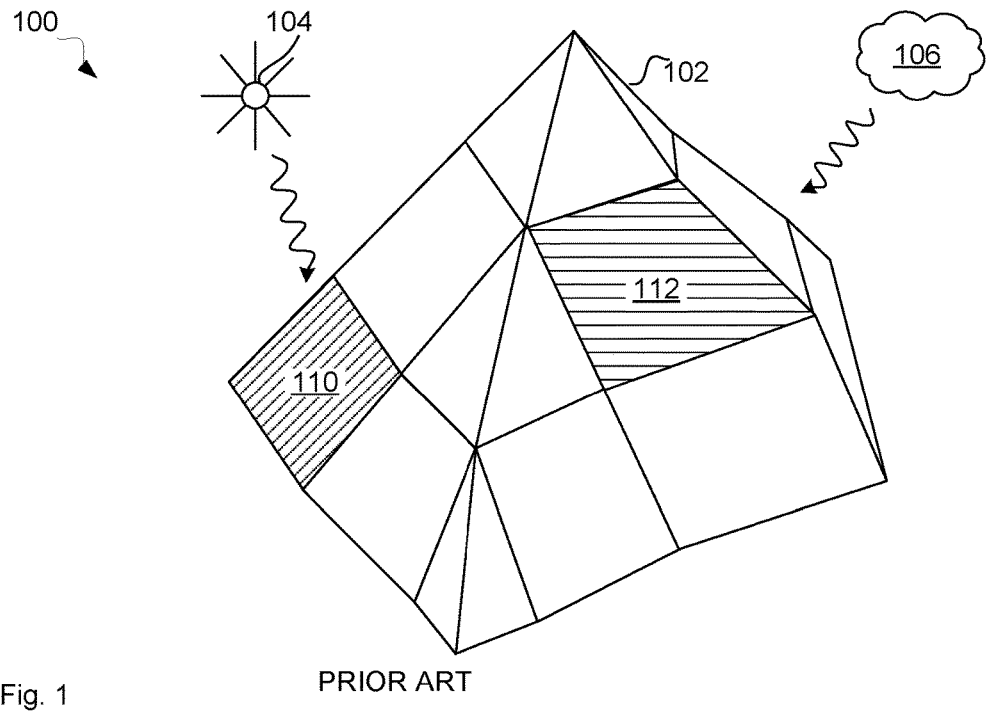
FIG. 1 illustrates an example scene (prior art).
Figure 2:
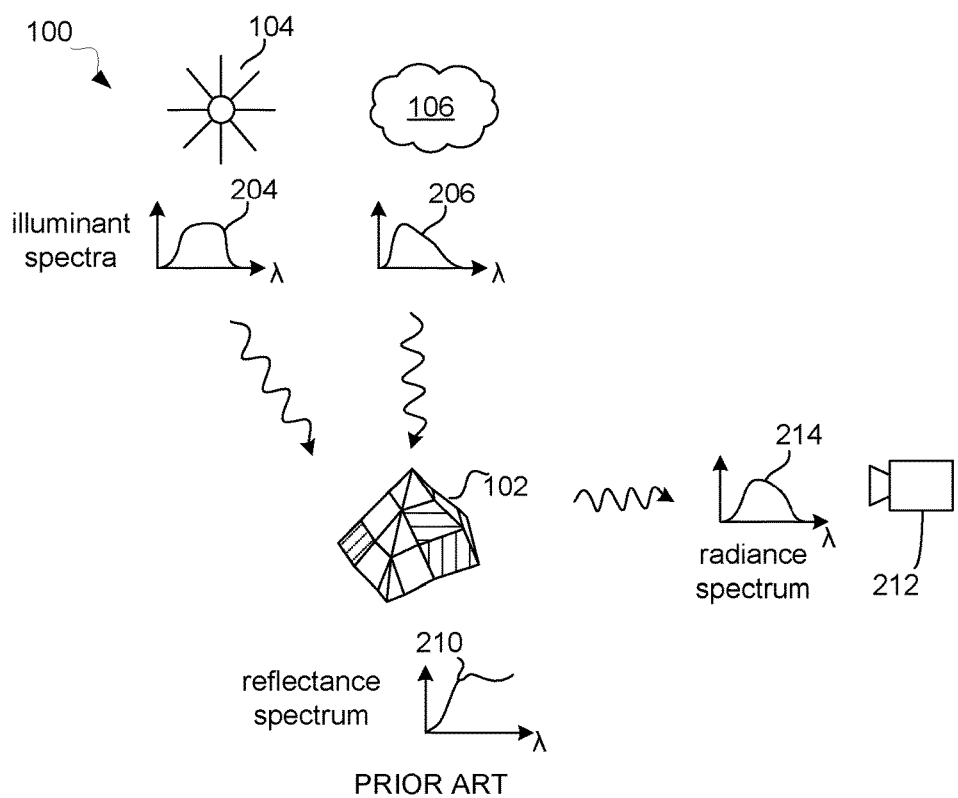
FIG. 2 illustrates the example scene of FIG. 1 in more detail (prior art).
Figure 3:
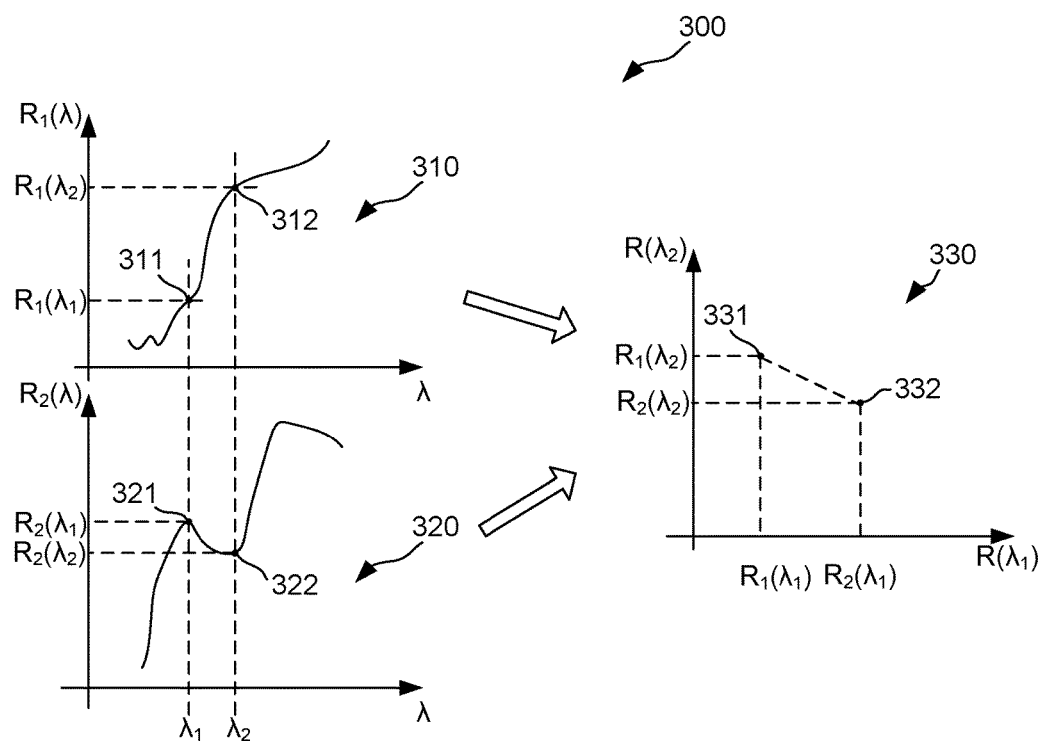
FIG. 3 illustrates the representation of radiance spectra in a spectral space (prior art).

FIG. 4 illustrates a computer system 400 for estimating an illumination spectrum of an image of scene 100. Computer system 400 comprises a sensor 402 and a computer 404. In this example the sensor 402 is a hyperspectral or multispectral sensor that is able to capture an image of a scene 100 illuminated by three light sources as explained with reference to FIG. 1.

In one example, the computer system 400 is integrated into a handheld device such as a consumer camera and the scene 100 may be any scene on the earth, such as a tourist attraction or a person. The sensor 402 may have a number of bands that balances computational costs with accuracy. The sensor 402 may have as low as four bands and as high as hundreds. In one example, sensor 402 is a Fluxdata camera FD-1665-MS7.

The computer 404 receives images from the sensor 402 via a data port 406 and the images are stored in local memory 408(b) by the processor 410. The processor 410 uses software stored in memory 408(a) to perform the method shown in FIG. 5. The program memory 408(b) is a non-transitory computer readable medium, such as a hard drive, a solid state disk or CD-ROM.

The processor 410 performs the method of estimating an illumination spectrum of the image.

Processor 410 may perform a method for decomposing hyperspectral or multispectral image data as described in U.S. Pat. No. 8,670,620 "Decomposing hyperspectral or multispectral image data", which incorporated herein by reference. For storing the input spectra, illumination spectra or other spectra the computer may employ the method described in WO 2009/152583 "Compact Representation of a Reflectance Spectrum" which is incorporated herein by reference.

The software provides a user interface that can be presented to the user on a monitor 412. The user interface is able to accept input from the user (i.e. touch screen). The user input is provided to the input/out port 406 by the monitor 412. The image is stored in memory 408(b) by the processor 410. In this example the memory 408(b) is local to the computer 404, but alternatively could be remote to the computer 404.

The processor 410 may receive data, such as image data, from data memory 408(b) as well as from the communications port 406. In one example, the processor 410 receives image data from the sensor 402 via communications port 406, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 410 receives and processes the image data in real time. This means that the processor 410 determines the illuminant spectrum every time the image data is received from sensor 402 and completes this calculation before the sensor 402 sends the next image data update.

Although communications port 406 is shown as single entity, it is to be understood that any kind of data port may be used to receive data, such as a network connection, a memory interface, a pin of the chip package of processor 410, or logical ports, such as IP sockets or parameters of functions stored on program memory 408(a) and executed by processor 410. These parameters may be stored on data memory 408(b) and may be handled by-value or by-reference, that is, as a pointer, in the source code.

The processor 410 may receive data through all these interfaces, which includes memory access of volatile memory, such as cache or RAM, or non-volatile memory, such as an optical disk drive, hard disk drive, storage server or cloud storage. The computer system 404 may further be implemented within a cloud computing environment, such as a managed group of interconnected servers hosting a dynamic number of virtual machines.

It is to be understood that any receiving step may be preceded by the processor 410 determining or computing the data that is later received. For example, the processor 410 determines the image data, such as by filtering the raw data from sensor 402, and stores the image data in data memory 408(b), such as RAM or a processor register. The processor 410 then requests the data from the data memory 408(b), such as by providing a read signal together with a memory address. The data memory 408(b) provides the data as a voltage signal on a physical bit line and the processor 410 receives the image data via a memory interface.

FIG. 5 illustrates a computer implemented method 500 for estimating an illumination spectrum for a point of an image as performed by processor 410. In other words, method 500 may serve as a blueprint or pseudo-code for software implemented in a particular programming language, such as C++, and stored on program memory 408(a) as compiled machine readable code. The image is comprised of points of wavelength indexed spectral data, such as multispectral image data or trichromatic data, such as RGB data.

Method 500 will be explained in broad terms first while a more detailed and more mathematical description follows afterwards.

FIG. 6 illustrates a data structure 600 for the multispectral image data. The data structure 600 comprises layers, one for each wavelength. Each layer represents the radiance values for one wavelength and all pixels and one example pixel 602 is highlighted. The values of pixel 602 for different wavelengths, that is the radiance values from lower layers at the same location as pixel 602, represent a radiance spectrum also referred to as the image spectrum or input spectrum. This input spectrum may be a mixture of multiple illumination spectra and the reflectance spectra of different materials present in the part of the scene that is covered by pixel 602.

In the following description, the term 'pixel' can be replaced by 'point of the image' to denote that the individually addressable image elements may be computed based on multiple pixels. For example, the image resolution may be reduced by combining pixels and the method 500 is performed on the low-resolution image having multiple points instead of pixels. Unless noted otherwise, if the word 'pixel' is used it may equally be applicable to a 'point of the image'.

Method 500 in FIG. 5 is based on multiple instances of the image data and FIG. 7a illustrates an example of multiple instances 702, 704 and 706, respectively, forming a scale space 700. Each of the multiple instances is associated with a refined amount of image information. While the examples below relate to instances associated with a reduced amount of image information, other examples relate to augmented image information, such as after noise reduction. Therefore, a refined amount of image information may be a reduced or an augmented amount of image information.

In the example of reduced image information, the multiple instances may also be referred to as multiple scales and define the scale space 700. In one example, instances 702 and 704 are copies of the original. Copies 704 and 702 are subjected to a blurring filter to reduce the amount of information in those copies. The radius of the blurring filter is larger for copy 702 than for copy 704 such that the least amount of information is associated with copy 702. FIG. 7a further shows an example point 708 of the image data at the finest scale, that is, the instance 706 associated with the maximum amount of information, which may be the original image data. In the example of augmented image data for each instance, the filter may be a sharpening or de-speckle filter. Augmenting the image information may also involve using additional sensor information, such as dark noise, a library or user provided input.

It is noted that each instance 702, 704 or 706 may be represented by an image cube 600 shown in FIG. 6. However, the multiple layers for the different wavelengths are omitted for clarity in FIGS. 7a and 7b.

As can be seen in FIG. 7a, the instances with reduced information 702 and 704 also comprise multiple points. In one example, the number of points in instances 702 and 704 is the same as the number of points in the original image data 706 and each point of instances 702 and 704 is the average of surrounding points. This average may be calculated for each wavelength index separately.

As a result, each point in the coarse instance 702 can be associated to the points of the middle instance 704 that contribute to the average of the point in the coarse instance 702. In other words, all points an middle instance 704 that are within the radius of the smoothing filter are associated with the resulting point in the coarse instance 702. Vice versa, points in the original image data instance 706 within the filter radius are associated with a point in the middle instance 704.

In another example, the points of the original image data 706 are subsampled and all points that are dropped in the neighbourhood of one point are associated with that point. Further below, these associations are formalised in the form of a factor graph 750 as shown in FIG. 7b.

Referring back to FIG. 5, processor 410 performs method 500 by determining 502 an optimised illumination spectrum for a point 708 based on an initial illumination spectrum and based on associations between the first point and multiple second points of multiple instances 702 and 704 of the image data, wherein each of the multiple instances 702 and 704 is associated with a reduced amount of image information as described above.

Multiple instances may refer to making multiple copies of the image data on the data memory 408(b) or may refer to a list of pointers stored on data memory 408(b). In yet another example, determining multiple instances may refer to executing program code that comprises a loop statement over the image data where the loop variable is updated such that at each iteration the accessed image data has a reduces amount of information. For example, by updating the loop variable i by i+=2, every second pixel is addressed and the image data is subsampled to reduce the amount of information in the accessed instance of the image data.

Processor 410 may determine the initial illumination spectra for the point 708 of each of the multiple instances based on multiple prototypes that may also be determined by processor 410 based on irregular regions or regular regions, such as patches, of the original image instance 706 and the reduced image instances 702 and 704.

This disclosure presents a method as performed by processor 410 to recover the pixelwise illuminant colour for scenes lit by multiple lights according to method 500. The following explanation starts from the image formation process and poses the illuminant recovery task in hand into an evidence combining setting. Processor 410 constructs a factor graph 750 making use of the scale space of the input image and a set of illuminant prototypes. It is noted that other relational structures, such as other graphs including metric graphs and hypergraphs may equally be used.

The computation of these prototypes is data driven and, hence, the method is devoid of libraries or user input. The use of a factor graph allows for the illuminant estimates at different scales, that is, instances with reduces amount of information, to be recovered making use of an inference process. Here, this process is statistical in nature. Moreover, the computation of the probability marginals used here is rendered as exact by constructing our factor graph making use of a Delaunay triangulation. For instance, consider the image of FIG. 1. The scene is being lit by two different light sources, that is, sun 104 and cloud 106. Processor 410 recovers pixelwise illuminants by making use of an inference process on a factor graph 750 defined across the scale space of the image under consideration. In some examples, the proposed method 500 does not assume smoothly varying illuminants across the scene. Secondly, some examples of the method 500 do not impose constraints on the reflectance or illumination gamuts for neither the input nor output imagery. Thirdly, processor 410 models the relationships between pixels and across scales using a factor graph [Kschischang01]. Moreover, the inference process used here is an exact one which hinges in the use of a variable elimination approach which does not change the topology of the graph.

Illuminant Estimation

As mentioned earlier, the explanation starts with the image formation process. Suppose that a location u in the scene is illuminated by a power spectrum L(λ), where λ is the sample wavelength variable. Then the spectral radiance I(u, λ) reflected from that location can be expressed as $$I(u, \lambda) = L(u, \lambda) R(u, \lambda), \qquad (1)$$

where L(u, λ) is the power spectrum of the light impinging on the object surface and R(u,•) is the product of the mean scattered power in the direction of the viewer and the surface reflectance spectrum [Horn86][Kimmel03].

In the further analysis, processor 410 considers a set of illuminant prototypes γ. We also introduce the scale space of the image and express the illuminant at pixel u and scale σ as a linear combination of the form $$L_\sigma(u) = \sum_{\ell_i \in \Upsilon} \omega_{i,\sigma}(u) \ell_i, \qquad (2)$$

where $\omega_{i,\sigma}(u)$ is the weight of the $i^{th}$ illuminant $l_i \in \gamma$ at scale σ. In the equation above, and as a matter of convenience, we have omitted the wavelength variable λ. Note that this can be done without any loss of generality and, hence, we do likewise throughout the remainder of the disclosure.

The use of the expression above allows processor 410 to treat the problem in hand in a manner akin to that used in labelling problems where the $i^{th}$ label corresponds to $l_i \in \gamma$. It is worth noting that the introduction of the set γ is not overly restrictive. Moreover, here, processor 410 adopts a data driven approach where the prototypes in γ are computed from the input image. This implies that the method can be devoid of a pre-computed library or user-aided input for the recovery of the prototypes $l_i$. More details on the computation of γ is provided further below.

Factor Graphs

As mentioned earlier, processor 410 uses factor graphs to recover the pixelwise illuminant. The choice of factor graphs stems from the fact that these are a generalisation of probabilistic graphical models, which allow processor 410 to formulate the problem in an evidence combining setting where the pixelwise illuminant can be viewed as a mixture of the prototypes γ across different scales. Processor 410 may use the max-product algorithm in factor graphs [Kschischang01] for purposes of inference.

Factor graphs generalise both Markov random fields and directed graphs such as Bayesian networks. They also model variable relationships that are not necessarily probabilistic.

To construct the graph, processor 410 employs the scale space of the image. FIG. 7a illustrates the interaction between three image scales 702,704 and 706. This, in effect, is a combinatorial pyramid [Brun00] where there is an inherent relationship of many-to-one from finer to coarser scales. Across each scale, each pixel also interacts with its neighbours.

FIG. 7b illustrates the factor graph 750 arising from the pyramid in the left-hand panel. In FIG. 7b, the factors are given by squared tokens whereby the variables in the graph are denoted by circles on the image lattice.

From a probabilistic viewpoint, in FIG. 7b, interacting variables can be used to define the nature of the conditional distributions within each scale. More formally, let the factor graph and the image scale be denoted by $\mathcal{G}$ and σ, respectively. In one example, we can express the probability of the pixel-wise illuminants L(u) ∈L across the image as follows $$P(L \mid \mathcal{G}) = \frac{1}{Z} \prod_{c \in C} \psi(L_c; \mathcal{G}) = \qquad (3)$$

$$\frac{1}{Z} \prod_{\substack{u,v \in \mathcal{G} \\ u \sim v}} P(I(u), I(v) \mid L(u), L(v)) \prod_{\sigma \in \Upsilon} \prod_{\ell_i \in \Upsilon} P(L_\sigma(u) \mid \ell_i).$$

where Γ is the set of scales under consideration, C is the clique-set of the graph, u~v implies the pixels u and v are adjacent to each other, $\psi(L_c; \mathcal{G})$ is the potential functions over the variable nodes in the graph for the clique c and Z is a partition function.

It is worth noting in passing that Equation (3) effectively conditions the illuminant distribution across the image to the potential functions for the variable nodes over the graph and the prototypes in γ. This is as each of the potential functions is defined over a subset of variables $L_c$ which comprises the illuminant estimates at each of the cliques c∈C. In this manner, every variable in a clique is connected to at least one other variable through a factor node. The union of variables, factors and the edges that connect them constitute the factor graph $\mathcal{G}$.

In processing Equation (3) processor 410 uses Bayes' rule to calculate the solution in terms of the likelihood and prior distributions with the partition function Z acting as a normalisation constant. Here, we have also assumed that illuminant priors $P(L_\sigma(u)|l_i)$ for the prototype illuminants across image scales σ∈Γ are independent from each other.

Note that, in some examples, the pixel neighbours on each scale can be used to compute cliques which, in turn, can be employed by processor 410 to define the likelihood function for the illuminant estimation process. This is reflected by the probability P(I(u), I(v)|L(u),L(v)), which captures the likelihood of the observed image data at neighbouring pixel sites given their respective illuminant estimates. On the other hand, the priors $P(L_\sigma(u)|l_i)$ correspond to the likelihood of an illuminant for a given pixel u at scale σ up to the prototype set γ.

Moreover, the Bayesian formulation in problem (3) lends itself, by construction, to a probability factorisation over the graph. This may be important since the inference process in hand can now be posed as a maximum a posteriori (MAP) process whose aim of computation is marginal probabilities $P(L_\sigma(u))$. This can be viewed as the optimisation given by $$\operatorname*{argmax}_L P(L \mid \mathcal{G}) =$$

$$\operatorname*{argmax}_L \left\{ \prod_{\substack{u,v \in \mathcal{G} \\ u \sim v}} P(I(u), I(v) \mid L(u), L(v)) \prod_{\sigma \in \Upsilon} \prod_{\ell_i \in \Upsilon} P(L_\sigma(u) \mid \ell_i) \right\}$$

where we have removed the partition function Z from further consideration since it is a constant that does not affect the maximisation above.

It is noted that instead of a MAP process, a maximum likelihood estimation or a maximum description length method may be used by processor 410.

For the computation of the illuminant prior conditional probability, processor 410 uses the angular error between the pixelwise illuminant and each of the prototypes in γ to write $$P(L_\sigma(u) \mid \ell_i) = \frac{1}{\gamma} \exp\left(-\left(1 - \frac{\langle L_\sigma(u), \ell_i \rangle}{\|L_\sigma(u)\| \|\ell_i\|}\right)\right), \quad (5)$$

where $\langle , \rangle$ is the inner product, $\|\cdot\|$ is the vector norm and $\gamma$ is a normalisation constant given by $$Y = \sum_{\ell_i \in \Upsilon} \exp\left(-\left(1 - \frac{\langle L_\sigma(u), \ell_i \rangle}{\|L_\sigma(u)\| \|\ell_i\|}\right)\right) \quad (6)$$

Similarly, for the likelihood, neighbouring pixels may be likely to have similar illuminant colour if their reflectance and shape are close to one another. Recall that the R(u, λ) variable in Equation (1) is the product of the reflectance and the mean scattered power. Moreover we note that the variable R(u, λ) can be written in compact form as follows $$R(u) = L(u)^{-T} I/(u) \quad (7)$$

where $I_n$ is an n×n the identity matrix.
Thus, we write $$P(I(u), I(v) \mid L(u), L(v)) = \frac{1}{\Omega} K(L(u), L(v)) \times \exp(-\|R(u) - R(v)\|^2), \quad (8)$$

where Ω is a normalisation constant given by $$\Omega = \sum_{\substack{u,v \in \mathcal{G} \\ u \sim v}} K(L(u), L(v)) \exp(-\|R(u) - R(v)\|^2) \quad (9)$$

and K(L(u), L(v)) is a kernel function.

For the kernel function, and similarly to Equation (5), processor 410 uses the exponential function of the Euclidean angle between the illuminant for adjacent pixels and write $$K(L(u), L(v)) = \exp\left(-\left(1 - \frac{\langle L(u), L(v) \rangle}{\|L(u)\| \|L(v)\|}\right)\right). \quad (10)$$

Inference Process

Note that Equations (5) and (8) provide the ingredients necessary to solve the MAP problem in Equation (4). The aim hence becomes that of inferring the marginal probabilities $P(L_o(u))$ of the illuminants at the finest scale. This is achieved through the use of a sum/max-product algorithm [27] which is a message passing strategy.

The max-product algorithm computes exact probability marginals of variables in a tree [31, 2]. It is worth noting that the developments below also apply to the max-product. This is since both, the max-product and sum methods are equivalent up to a log-space mapping that does not affect the maximum of the likelihood. In order to take advantage of the exact inference property of the max-product algorithm, processor 410 partitions the factor graph and converts the sub-graphs into a collection of local tree structures. Performing exact inference on factor graphs with cycles, such as the grid-graph arising from the lattice on the imagery by converting them into trees is a procedure may be effected via variable elimination [42, 12]. Variable elimination algorithms, however, introduce fill-edges for cycles larger than three. As a result, they often change the topology of graphs under study [Barber12]. This is an undesirable effect since it invariably alters the inference problem in hand.

In some examples, processor 410 performs variable elimination using a convex hull algorithm for Delaunay triangulations [Watson81] since Delaunay triangulations are chordal graphs, i.e. every cycle comprising four or more vertices has a chord between them, that do not introduce any fill edges in a sum(max)-product variable elimination ordering [Koller09]. Further, Delaunay triangulations have low tree-width, i.e. the number of variables in a clique, reducing computational complexity during message passing.

FIGS. 8a and 8b show a simplified realisation of the factor graph for the MAP problem in Equation (4) as stored on program memory 408(a). FIG. 8a shows the joint interaction between variables across different scales. This is, effectively, a realisation of the pyramid-like structure in FIG. 7b. FIG. 8b illustrates the message passing process between variables and factors in a close-up diagram. In the figure, and for the sake of clarity, we have adopted the following notation. For the illuminant variables at different scales, we have used x and y, respectively. We have denoted the factors as f and g and used µ to indicate a message flowing in the direction of the sub-indexed arrow.

Note that, from the figure, we can observe that the variable node x "passes on" the corresponding probability to a factor node f, i.e.

$$\mu_{x \to f} = \prod_{\substack{g \in \mathcal{N}_x \\ g \neq f}} \mu_{g \to x}, \quad (11)$$

where $\mathcal{N}$ is the set of factor nodes neighbouring the variable node x.

Moreover, the factor-to-variable interactions can be expressed explicitly as follows $$\mu_{f \to x} = \prod_{\substack{y \in \mathcal{N}_f \\ y \neq x}} \mu_{y \to f}, \quad (12)$$

where $\mathcal{N}_f$ is the set of all variable nodes in the neighbourhood of the factor f. The process of message passing as performed by processor 410 entails computing probability distributions and marginalisation.

The definition of the distributions at factors is determined by the nature of the node, i.e. either intra-scale likelihood or within-scale factor node, respectively. The "message" of a given variable is then computed by using a sum- or maximum-rule to marginalise posteriors over all other variables, except the one being queried.

After the messages have been sent in both directions on all edges in the graph, each factor will contain the joint posterior probability distributions of the variables adjacent to the factor under consideration. As a result, in order to obtain the marginal distribution for any one variable in the clique processor 410 marginalises with respect to the adjacent variables making use of the joint distribution.

As a result of this treatment, processor 410 can compute the optimal illuminant estimate $L_o(u)$ at each pixel u and scale σ using the marginals as the weights in Equation (2). Thus, making use of the notation above and Bayes rule:

$$P(\ell_i | L_\sigma(u)) = \frac{P(L_\sigma(u) | \ell_i) P(\ell_i)}{P(u)} \quad (13)$$

Note that the probability $P(l_i|L_o(u))$ is, in practice, the posterior probability of a pixel being illuminated by the illuminant $l_i \in \gamma$. For all pixels, this is equivalent to the distribution $P(L|\mathcal{G})$.

Similarly, the pixelwise illuminant estimate at a scale σ can be viewed as the expected value of the illuminants across scales, i.e.

$$L_\sigma(u) = \frac{\sum_{\ell_i \in \Gamma} P(\ell_i | L_\sigma(u)) \ell_i}{\sum_{\ell_i \in \Gamma} P(\ell_i | L_\sigma(u))}, \quad (14)$$

such processor 410 can approximate that the overall pixel-wise illuminant by the geometric mean, $$L(u) = \left[ \prod_{\sigma \in \Gamma} L_\sigma(u) \right]^{-|\Gamma|}, \quad (15)$$

where Γ is, as before, the set of scales under consideration.

Implementation

The method may commence by processor 410 computing the scale space 700 for the input image. Processor 410 may use a Gaussian scale space over an octave with three different intermediate scales. As described above, this yields a factor graph 750 which can be viewed as a three-level pyramid and represents the associations between the points of the scale space 700.

Once the scale space 700 is in hand, processor 410 proceeds to compute the set of prototypesγ and to initialise the illuminant variables $L_{94}$ (u). This is done as follows. Processor 410 commences by computing a local estimate of the illuminant at each scale by dividing the scaled image into small patches (in one example these are 10×10 pixels at full resolution). At every patch, processor 410 applies an existing colour constancy algorithm. This can be done making use of a number of methods, such as grey world [Buchsbaum80], white patch [Land71] and the $1^{st}$ and $2^{nd}$ order grey edge methods [Weijer07].

As a result, the initial estimate of $L_o(u)$ may be uniform across those pixels in the corresponding patch. It is worth noting, however, that the choice of patch size is motivated by computational complexity. Nonetheless, processor 410 may compute a pixel-wise estimate by taking neighbourhoods about each pixel under consideration at each scale.

To compute the set γ, processor 410 may apply the mode seeking method in [Vedaldi08] to the initial estimates of $L_o(u)$. This follows the intuition that the prototypes $l_i$ are expected to correspond to the modes of the distribution of initial estimates across the scale space of the image. This also has the advantage that the cardinality of γ, i.e. the number of prototypes $l_i$, is data driven and determined by the distribution of $L_o(u)$. It is worth noting in passing that other methods, such as k-means or maximum likelihood estimation (MLE) can be equally used to compute these estimates.

Once the initialisation of $L_o(u)$ is effected and the set of prototypesγ is stored on data memory 408(b), processor 410 proceeds to compute the graph using a Delaunay triangulation across the three-level pyramid comprised by the image lattice at the three different scales under consideration. With the factor graph in data memory 408(b), processor 410 applies the message passing algorithm described above so as to solve the MAP problem in Equation (4).

Finally, processor 410 uses the posterior probability $P(l_i|I(u))$ to compute the pixel-wise illuminant using Equations (13) and (14) by setting $$\frac{P(\ell_i)}{P(u)}$$

as a constant. This follows the intuition that the probability of each prototype and pixel-site are uniform across the image, i.e. each prototype and pixel in the image are equally likely. With the posteriors in hand, the pixelwise illuminant is given by Equation (15).

Experiments

FIGS. 9a and 9b show example images that may be processed using method 500.

For performing method 500 processor 410 can employ a variety of existing colour constancy methods. Prominent examples are the White Patch (WP) [Land71], Grey World (GW) [Buchsbaum80] and first and second order Grey Edge ($1^{st}$ GE and $2^{nd}$ GE) [39] algorithms.

In FIGS. 10a to 10c and 11a to 11c, we show two input scenes, the illuminant map recovered by our method and the colour corrected image, which can be computed using Equation (7). Note that the colour corrected images in FIGS. 10c and 11c are devoid of object chromaticity changes induced by the illuminant in the input images.

For instance, in FIG. 10a the background is dominated by skylight whereas the foreground is being lit by a tungsten lamp. In FIG. 10c a "warm" feeling of the tungsten upon the tower and a "cool" feeling of the skylight have both been removed. In a similar manner, changes in hue induced by the scattering underwater on the image in FIG. 11a has been removed via colour correction using the illuminant map in FIG. 11b. The illuminant maps are in good accordance with the per pixel changes expected from the top row imagery.

For the above calculation, processor 410 may obtain different scales by smoothing the image data using the Gaussian kernel $$G(u; \sigma) = \frac{1}{\sqrt{2\pi}\,\sigma} e^{-\frac{u^2}{2\sigma^2}}, \quad (16)$$

where the variance σ represents the scale.

In one example, processor 410 processes multiple initialisation spectra for a single point leading to multiple subgraphs. In particular, processor 410 processes the pixelwise illuminant estimates $L_{o,k}(u)$ at each of these subgraphs as variables, i.e. $\mathcal{V} = \cup_{u,\sigma,k} L_{o,k}(u)$. The factors, on the other hand, can be processed as the potential functions $\psi(L_c)$ which define the relationship between a subset of connected variables, i.e. over a clique c. Note that in coding theory and low-density parity-check codes these potentials are multivariate functions of Fourier transforms. Here, the factorisations are probabilities governed by the image data and the illuminant prototype set $\gamma_k$.

FIG. 12 illustrates a diagram 1200 of the factor graph used here showing the relationships between subgraphs and pixels at different scales. From a probabilistic standpoint, processor 410 may process the interrelated variables of the graphical structure in FIG. 12 as conditional distributions within and across scales of each subgraph. In this setting, if $\mathcal{G}$ denotes a factor subgraph for the $k^{th}$ colour constancy method employed at initilisation, the complete graph $\mathcal{G}$ can be fully written as the union over the set of subgraphs $\mathcal{K}$ given by $$\mathcal{G} = \bigcup_{\mathcal{G}_k \in \mathcal{K}} \mathcal{G}_k. \quad (17)$$

This is important since the probability of the pixelwise illuminants across the image L given the graph $\mathcal{G}$ can be viewed as the product of the potentials over the clique set C of the graph. This, in turn, can be expressed in terms of the set of subgraphs $\mathcal{K}$ and the pixelwise illuminant $L_k$ (u) for the $k^{th}$ subgraph as follows $$P(L|\mathcal{G}) = \frac{1}{Z} \prod_{c \in C} \psi\left(L_c; \bigcup_{\mathcal{G}_k \in \mathcal{K}} \mathcal{G}_k\right) = \quad (18)$$

$$\frac{1}{Z} \prod_{\mathcal{G}_k \in \mathcal{K}} \prod_{u,v \in \mathcal{G}_k, u \sim v} P(I(u), I(v) | L_k(u), L_k(v))$$

$$\prod_{\sigma \in \Gamma} \prod_{\ell_i \in \Upsilon_k} P(L_{\sigma,k}(u) | \ell_i),$$

where $\Gamma$ is the set of scales under consideration, C is the clique-set of all factors in the graph, u~v means that pixels u and v are neighbouring each other, $\psi(L_c; \mathcal{G})$ is the potential function over connected variables in the clique c∈C and Z is a partition function.

It is worth mentioning that the relationship between subgraphs can be captured using a variety of distributions for the probability $P(L_k (u)|L_{k-1}(u))$. Here, as mentioned earlier, we have assumed a one-to-one correspondence across subgraphs and, for the sake of simplicity, employ a uniform distribution for $P(L_k(u)|L_{k-1}(u))$. This, in effect, permits us to remove $P(L_k(u)|L_{k-1}(u))$ from further consideration and, hence, we focus our attention on the Bayesian formulation in Equation (17). This allows a probability factorisation over the graph. This is important since the inference process can now be posed as maximum a posteriori (MAP) inference over the subgraphs. The objective hence becomes, to compute marginal probabilities $P(L_{o,k}$ (u)) for the variable set in the graph. This can be expressed in an optimisation setting as follows $$\operatorname*{argmax}_{L} P(L | \mathcal{G}_k) = \quad (19)$$

$$\operatorname*{argmax}_{L} \left\{ \prod_{\mathcal{G}_k \in \mathcal{K}} \prod_{u, v \in \mathcal{G}_k u \sim v} P(I(u), I(v) | L_k(u), L_k(v)) \right.$$

$$\left. \prod_{\sigma \in \Gamma} \prod_{\ell_i \in \Upsilon_k} P(L_{\sigma,k}(u) | \ell_i) \right\}$$

where the partition function Z has been removed from further consideration since it is a constant that does not affect the maximisation above.

The following documents are incorporated herein by reference:

[Brun00] L. Brun and Walter Kropatsch. The Construction of Pyramids with Combinatorial Maps. Technical report, 63, Institute of Computer Aided Design, Vienna University of Technology, 1str. 3/1832,A-1040 Vienna AUSTRIA, 2000.

[Barber12] Barber, David. *Bayesian Reasoning and Machine Learning*. Cambridge University Press, New York, N.Y., USA, 2012.

[Buchsbaum80] G. Buchsbaum. A spatial processor model for object colour perception. *Journal of the Franklin Institute*, 310(1):1-26, 1980.

[Dechter99] Rina Dechter. Bucket elimination: A unifying framework for reasoning. *Artificial Intelligence*, 113(1-2):41-85, 1999.

[Horn86] B. K. P. Horn and M. J. Brooks. The Variational Approach to Shape from Shading. *CVGIP,* 33(2):174-208, 1986.

[Judea88] Pearl, Judea. *Probabilistic Reasoning in Intelligent Systems: Networks of Plausible Inference*. Morgan Kaufmann Publishers Inc., San Francisco, Calif., USA, 1988.

[Kimmel03] R. Kimmel and M. Elad and D. Shaked and R. Keshet and I. Sobel. A Variational Framework for Retinex. *Int. Journal of Computer Vision*, 52(1):7-23, 2003.

[Koller09] Koller, Daphne and Friedman, Nir. *Probabilistic Graphical Models: Principles and Techniques—Adaptive Computation and Machine Learning*. The MIT Press, 2009.

[Kschischang01] Frank Kschischang and Brendan J. Frey and Hans-andrea Loeliger. Factor Graphs and the Sum-Product Algorithm. *IEEE Trans. Inf. Theory*, 47:498-519, 2001.

[Land71] Edwin H. Land and John J. McCann. Lightness and Retinex Theory. *J. Opt. Soc. Am.*, 61(1):1-11, 1971.

[Zhang94] Zhang, Nevin L and Poole, David. A simple approach to Bayesian network computations. *Proc. of the Tenth Canadian Conf on Artificial Intelligence*, 1994.

[Vedaldi08] A. Vedaldi and S. Soatto. Quick Shift and Kernel Methods for Mode Seeking. *European Conference on Computer Vision*, pages 705-718, 2008.

[Watson81] D. F. Watson. Computing the n-dimensional Delaunay tessellation with application to Voronoi polytopes. *The Computer Journal*, 24(2):167-172, 1981.

[Weijer07] van de Weijer, J. and Gevers, T. and Gijsenij, A. Edge-Based Color Constancy. *Image Processing, IEEE Transactions on*, 16(9):2207-2214, 2007.

The invention claimed is:

1. A method for determining an illumination spectrum for a first point of image data, the method comprising:
    determining the multiple instances of the image data by refining the amount of information associated with each of the multiple instances, wherein refining the amount of information comprises subsampling the image data; and
    determining an optimised illumination spectrum for the first point based on an initial illumination spectrum and based on associations between the first point and multiple second points of the multiple instances of the image data, wherein each of the multiple instances is associated with the refined amount of image information.

2. The method of claim 1, further comprising determining the initial illumination spectrum for the first point and multiple initial illumination spectra for each of the multiple second points based on multiple prototypes of illuminant spectra.

3. The method of claim 2, further comprising determining the multiple prototypes of illuminant spectra based on the multiple instances of the image data.

4. The method of claim 3, wherein determining the multiple prototypes comprises determining the multiple prototypes based on regions of the image data and the multiple instances of the image data.

5. The method of claim 1, further comprising determining the associations between the first point and the multiple second points.

6. The method of claim 5, wherein determining the associations comprises creating a relational structure between the multiple instances.

7. The method of claim 6, wherein creating the relational structure comprises performing a triangulation.

8. The method of claim 1, wherein refining the amount of information comprises applying a filtering operation to the image data.

9. The method of claim 1, wherein refining the amount of information comprises augmenting the image data.

10. The method of claim 1, wherein determining the optimised illumination spectrum comprises performing message passing over the associations.

11. The method of claim 1, wherein determining the optimised illumination spectrum comprises performing a statistical estimation of the illumination spectrum for the first point of the image data.

12. The method of claim 1, wherein the image data is one of:
hyperspectral image data; and
trichromatic image data.

13. The method of claim 1, further comprising performing white balance adjustment based on the illumination spectrum.

14. The method of claim 1, further comprising determining multiple initial illumination spectra for the first point, wherein determining the optimised illumination spectrum is based on the multiple initial illumination spectra for the first point.

15. The method of claim 14, wherein each of the multiple illumination spectra is associated with a respective subgraph.

16. Software that, when installed on a computer, causes the computer to perform the method of claim 1.

17. The method of claim 1, wherein the multiple instances form a scale space and a factor graph characterises the associations between the first point and the multiple second points of multiple instances of the scale space of the image data.

18. The method of 17, wherein determining the optimised illumination spectrum comprises: constructing the factor graph making use of the scale space and the multiple prototypes of illuminant spectra and performing message passing to compute an exact probability marginal of variables in the factor graph.

19. A computer system for determining an illumination spectrum for a first point of image data, the computer system comprising:
an input port to receive the image data; and
a processor to
determine the multiple instances of the image data by refining the amount of information associated with each of the multiple instances, wherein refining the amount of information comprises subsampling the image data; and
determine an optimised illumination spectrum for the first point based on an initial illumination spectrum and based on associations between the first point and multiple second points of the multiple instances of the image data, wherein each of the multiple instances is associated with the refined amount of image information.

* * * * *